US007095963B2

(12) United States Patent
Knaack et al.

(10) Patent No.: US 7,095,963 B2
(45) Date of Patent: Aug. 22, 2006

(54) MULTI-CHANNEL OPTICAL RECEIVER FOR PROCESSING TRI-CELL POLARIZATION DIVERSITY DETECTOR OUTPUTS

(75) Inventors: William Christopher Knaack, West Hills, CA (US); John Thomson Douglass, IV, WoodlandHills, CA (US); Eugene Louis Ferraro, Simi Valley, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 748 days.

(21) Appl. No.: 10/333,939

(22) PCT Filed: Jul. 30, 2001
(Under 37 CFR 1.47)

(86) PCT No.: PCT/US01/24098

§ 371 (c)(1),
(2), (4) Date: Jan. 23, 2003

(87) PCT Pub. No.: WO03/017535

PCT Pub. Date: Feb. 27, 2003

(65) Prior Publication Data

US 2004/0047640 A1      Mar. 11, 2004

Related U.S. Application Data

(60) Provisional application No. 60/221,636, filed on Jul. 28, 2000.

(51) Int. Cl.
  *H04B 10/06*      (2006.01)

(52) U.S. Cl. .................. 398/205; 398/206; 375/261; 375/298

(58) Field of Classification Search ............... 398/162, 398/205–209, 213; 375/261, 298
See application file for complete search history.

(56) References Cited

U.S. PATENT DOCUMENTS

| | | | | |
|---|---|---|---|---|
| 5,287,556 A | * | 2/1994 | Cahill ........................ 455/266 |
| 5,420,536 A | * | 5/1995 | Faulkner et al. ............ 330/149 |
| 5,600,474 A | * | 2/1997 | Tomesen et al. ............ 398/205 |
| 5,852,507 A | * | 12/1998 | Hall ............................ 398/205 |
| 6,693,670 B1 | * | 2/2004 | Stark .......................... 348/308 |

* cited by examiner

*Primary Examiner*—Dzung Tran
(74) *Attorney, Agent, or Firm*—Lynn & Lynn

(57) ABSTRACT

An optical receiver system for processing signals output from a polarization diversity detector that includes a plurality of photodetector cells. Each cell provides an signal that includes a phase generated carrier signal having a modulation frequency ω and a sensor signal that has an in-phase component I and a quadrature phase component Q superimposed on the phase generated carrier signal. A plurality of variable gain amplifiers are arranged to produce a plurality of amplified signals. A feedback circuit is connected to the plurality of variable gain amplifiers for controlling the gains thereof. A plurality of demodulator circuits are arranged to receive the amplified signals. The demodulator circuits are arranged to provide for each photodetector cell an I signal output that indicates an amplitude of the in-phase component I and a Q signal output that indicates an amplitude of the quadrature phase component Q.

14 Claims, 5 Drawing Sheets

MULTI-CHANNEL OPTICAL RECEIVER FOR PROCESSING TRI-CELL POLARIZATION DIVERSITY DETECTOR OUTPUTS

CROSS REFERENCE TO RELATED APPLICATION

Applicants claim the benefit of U.S. Provisional Application Ser. No. 60/221,636, filed Jul. 28, 2000 for Multi-channel Optical Receiver for Processing Tri-Cell Polarization Diversity Detector Outputs.

BACKGROUND OF THE INVENTION

This invention relates generally to processing signals output from an interferometer sensor array. This invention relates particularly processing signals output from a fiber optic interferometer sensor array arranged to monitor a physical parameter by means of phase changes in such an array when it is exposed to the parameter. Still more particularly, this invention relates to processing signals output from an array of tri-cell photodetector array used to detect signals output from an interferometer sensor array.

Mismatched fiber optic interferometers are commonly used as sensing elements in fiber optic sensor arrays for measuring changes in a parameter such as fluid pressure, acceleration, magnetic field intensity, etc. Such sensing elements measure the time-varying phase delay between optical signals that have propagated along separate optical paths having unequal path length.

Mixing between a reference signal and a data signal is often necessary to extract information from an optical carrier. In interferometric sensing the mixing is typically between a reference signal and a signal whose phase has been modified, or modulated by the parameter being measured.

Modulation is commonly used to transmit information from an information source, such as a sensor system where information is detected, to an information destination, such as a receiver system where detected signals are received and processed. According to conventional modulation techniques, a signal of interest detected by a sensor modulates a carrier signal by modifying one or more characteristics of the carrier signal, such as amplitude, frequency or phase, to form a modulated carrier signal. The modulated carrier signal is then more easily transmitted over the appropriate communication channels to the destination or receiver system where the modulated carrier signal is demodulated to recover the signal of interest and determine the information.

One type of sensor system that employs modulation techniques includes fiber optic sensors, for example, as used in fiber optic interferometers for distance measurements. The fiber optic sensors detect or sense light signals that modulate the output phase of the sensor system or interferometer. The modulated carrier can then be photodetected and transmitted to a receiver system. In a system having an array of sensors, the signals are often multiplexed, for example, using time division multiplexing (TDM) and/or wavelength division multiplexing (WDM).

Fiber optic sensor systems acquire in the demodulation process a signal component proportional to the sine of the sensor phase shift and another signal component proportional to the cosine of the phase shift. The sine of the sensor phase shift is referred to as the quadrature term, Q; and the cosine of the sensor phase shift is referred to as the in-phase term, I. The angle of the phase shift is determined by calculating ratio Q/I, which is the tangent of the sensor phase shift. The amplitudes of the sine and cosine terms must be set equal by a normalization procedure to ensure the successful implementation of an arctangent routine to find the sensor phase shift.

One type of modulation technique used in interferometers and other sensor systems uses phase generated carriers. The sensor's time varying phase signal (signal of interest) modulates the phase generated carriers to form a modulated carrier. Both the signal of interest and the phase generated carriers can be mathematically represented as a Bessel series of harmonically related terms. During modulation, the Bessel series of the signal of interest modulates the Bessel series of the phase generated carrier. The number of terms in the Bessel series of the resulting modulated carrier will be dependent upon the level of the measured or detected signal of interest. The harmonically related terms in the Bessel series of the modulated carrier represent both the measured or detected signal of interest and the carrier signal.

Typical fiber optic sensor systems using phase generated carriers to transmit a detected or measured signal (signal of interest) to a receiver system have used a pair of quadrature carriers with frequencies of either $\omega_c$ and $2\omega_c$ or $2\omega_c$ and $3\omega_c$, where $\omega_c$ is the phase generated carrier frequency. In multiplexed sensor systems, the sensor sampling frequency $f_s$ must be selected to ensure that frequencies greater than $f_s/2$ are not aliased into the band of interest below $f_s/2$.

In some systems the optical signal input to the interferometer is a phase generated carrier produced by producing time-dependent variations in the frequency of the optical signal output by a laser. A phase generated carrier may be produced by various techniques. One technique involves routing the source output through a phase modulator and applying a sequence of separate and different linear ramp voltages to the linear phase modulator to produce step changes in the optical frequency.

Another technique for producing a phase generated carrier uses sinusoidal phase modulation of the source signal. Instead of sampling signals associated with separate optical frequencies, the sampling of signals is associated with integration over portions of a period of the phase generated carrier.

Still another technique for producing a phase generated carrier involves the use of a numerically controlled oscillator (NCO). A problem with using an NCO in an array comprising a plurality of interferometric sensors is an uncertainty in the sign of the sensor response under certain conditions. In particular, carriers that are 180° out of phase with the NCO phase will produce sensor responses with opposite sign after demodulation different than those produced by carriers that are in phase with the NCO phase. When coherently combined, sensor responses with opposite signs will combine destructively, which results in an attenuation of the combined output and a reduction in overall system dynamic range.

A significant problem in systems that employ the reception of optical signals from an optical fiber is signal fading caused by changes in the polarization of the optical signals transmitted through the optical fiber. Specifically, phase information from two or more optical signals propagated through a fiber optic transmission line can be lost at the receiver if the polarizations of two signals of interest are crossed, resulting in no detector beat note. It is therefore necessary to provide some mechanism for treating the signal that yields a suitably large detector beat note for signal processing in all cases of polarization wander.

Polarization diversity detectors are used to detect an optical signal of uncertain polarization and produce an electrical output corresponding to a selected polarization component in the optical signal. U.S. Pat. No. 5,852,507, which issued Dec. 22, 1998 to David B. Hall and which is assigned Litton Systems, Inc., assignee of the present invention, discloses a tri-cell polarization diversity detector that produces multiple output signals from an incident beam that has two orthogonal polarization components. The disclosure of U.S. Pat. No. 5,852,507 is incorporated by reference into the present disclosure.

U.S. Pat. No. 5,448,058, which issued Sep. 5, 1995 to Arab-Sadeghabadi and vonBierein and which is assigned Litton Systems, Inc., assignee of the present invention, discloses a polarization diversity detector that includes an array of three polarizers having axes of polarization spaced apart by selected angles such that an optical signal incident on the polarizer array has a component along at least one of the axes of polarization. A photodetector array is arranged such that each photodetector receives light from a selected one of the polarizers. At least one of the photodetectors receives parallel polarization components that form an electrical signal that indicates interference between the parallel polarization components. The disclosure of U.S. Pat. No. 5,448,058 is incorporated by reference into the present disclosure.

SUMMARY OF THE INVENTION

The present invention provides a design for taking advantage of the tri-cell PDD in the detection of signals from fiber optic sensors. This invention also accommodates a wide range in input sensor scale factors. This invention processes all three tri-cell outputs and provides dynamic saturation control, which maximizes the signal to noise performance of the receiver for a given input.

An optical receiver system according to the invention for processing signals output from a polarization diversity detector that includes a plurality of photodetector cells, the polarization diversity detector output signal including for each photodetector cell a phase generated carrier signal having a modulation frequency $\omega$ and a sensor signal that has an in-phase component I and a quadrature phase component Q superimposed on the phase generated carrier signal, comprises a plurality of variable gain amplifiers arranged in corresponding relationship to the photodetector cells and arranged to produce a plurality of amplified signals and a feedback circuit connected to the plurality of variable gain amplifiers for controlling the gains thereof. The invention further comprises a plurality of demodulator circuits arranged to receive the amplified signals. The demodulator circuits are arranged to provide for each photodetector cell an I signal output that indicates an amplitude of the in-phase component I and a Q signal output that indicates an amplitude of the quadrature phase component Q.

The feedback circuit in the optical receiver system according to the invention preferably comprises a saturation detection circuit that provides a saturation signal if the gain of the variable gain amplifier exceeds a predetermined value; and a signal processor connected to the saturation circuit. The signal processor is arranged to produce a gain control signal for reducing the gain of the variable gain amplifier if a saturation condition exists. The feedback circuit also preferably comprises a multiplexer arranged to receive the amplified signals and selectively provide the amplified signals to the signal processor.

Each of the plurality of demodulator circuits preferably comprises a first mixer that combines the polarization diversity detector output signal with a first demodulation signal of frequency $\omega$ to separate the in-phase output signal I from the phase generator carrier signal and a second mixer that combines the polarization diversity detector output signal with a second demodulation signal of frequency $2\omega$ to separate the in-phase output signal QS from the phase generator carrier signal.

The invention also preferably comprises a plurality of anti-alias filter connected between the variable gain amplifiers and the analog to digital converters. A plurality of unity gain buffer stages may be connected between the anti-alias filters and the analog to digital converters The invention may also comprise an optical receiver system for processing signals output from a polarization diversity detector array that includes a plurality of polarization diversity detectors, each of the plurality of polarization diversity detectors including a plurality of photodetector cells that provide each provide a detector signal that includes a phase generated carrier signal having a modulation frequency and a corresponding sensor signal that has an in-phase component I and a quadrature phase component Q superimposed on the phase generated carrier signal that includes a plurality of channels arranged in corresponding relationship with polarization diversity detector. Each channel preferably comprises a plurality of variable gain amplifiers arranged in corresponding relationship to the photodetector cells in each polarization diversity detector and arranged to produce a plurality of amplified signals, a feedback circuit arranged in corresponding relationship to the plurality of variable gain amplifiers for controlling the gains thereof; and a plurality of demodulator circuits connected arranged to receive corresponding amplified signals, each of the demodulators circuit being formed to provide and I signal output that indicates an amplitude of the in-phase component I and a Q signal output that indicates an amplitude of the quadrature phase component Q. The optical receiver system also includes a first shift register arranged to receive the I signal output from each of the demodulator circuit, a second shift register arranged to receive the Q signal output from each of the demodulator circuits; and a rectangular to polar converter connected to the first and second shift registers for calculating a phase angle for each corresponding I signal and Q signal.

DETAILED DESCRIPTION OF THE INVENTION

Figure 1:
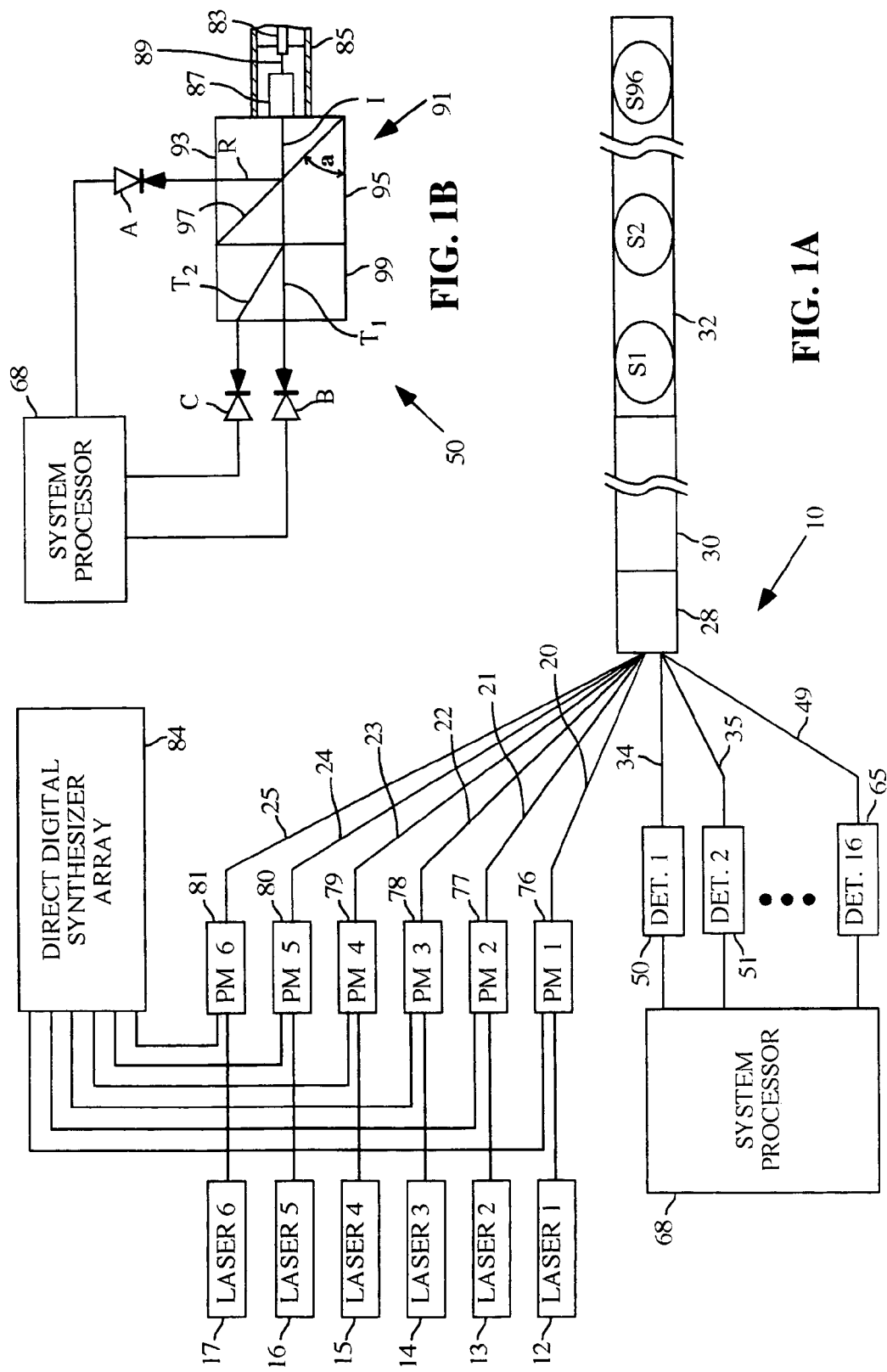
FIG. 1A illustrates a fiber optic sensor array that may include the optical receiver system according to the present invention.
FIG. 1B illustrates a tri-cell photodetector that may be included in the sensor array of FIG. 1A.

This invention is directed to a signal processing system for processing signals output from a sensor over a wide range of sensitivities. FIG. 1A illustrates a multi-channel fiber optic sensor system 10 with which the present invention may be used. The invention is applicable to other sensor architectures (not shown) and with other polarization diversity detectors (not shown). The particular fiber optic sensor system 10 and polarization diversity detector 11 are disclosed herein only to provide examples of such apparatus that may be used with the invention.

The fiber optic sensor system 10 is fully disclosed in U.S. patent application Ser. No. 09/429,048, filed Oct. 29, 1959 and assigned to Litton Systems, Inc., assignee of the present invention. The fiber optic sensor system 10 is also fully disclosed in U.S. patent application Ser. No. 09/430,057, filed Oct. 29, 1959 and assigned to Litton Systems, Inc. The fiber optic sensor system 10 includes a plurality of lasers 12–17 arranged to supply a plurality of corresponding optical feed lines 20–25. The optical feed lines are joined at an optical terminator 28. The optical terminator 28 is connected to a downlead cable 30, which is connected to an acoustic array cable 32. The acoustic array cable 32 houses a plurality of sensors, which in this exemplary embodiment total ninety-six and are designated S1–S96. The optical terminator 28 also provides a link between the downlead cable 30 and a plurality (e.g., 16) of return fibers 34–49, which are arranged provide to a plurality of corresponding polarization diversity detectors 50–65. The outputs of the polarization diversity detectors 50–65 are electrically connected to a system processor 68.

A plurality of phase modulators 76–81 are arranged to modulate the optical signals output from the lasers 12–17, respectively. Each of the lasers 12–17 generates an optical signal having a different optical wavelength. Preferably, the phase modulators 76–81 are each characterized by a different modulation frequency. Accordingly, the lasers 12–17 produce six optical signals, each having different optical wavelengths and each modulated at a separate modulation frequency.

Figure 2:
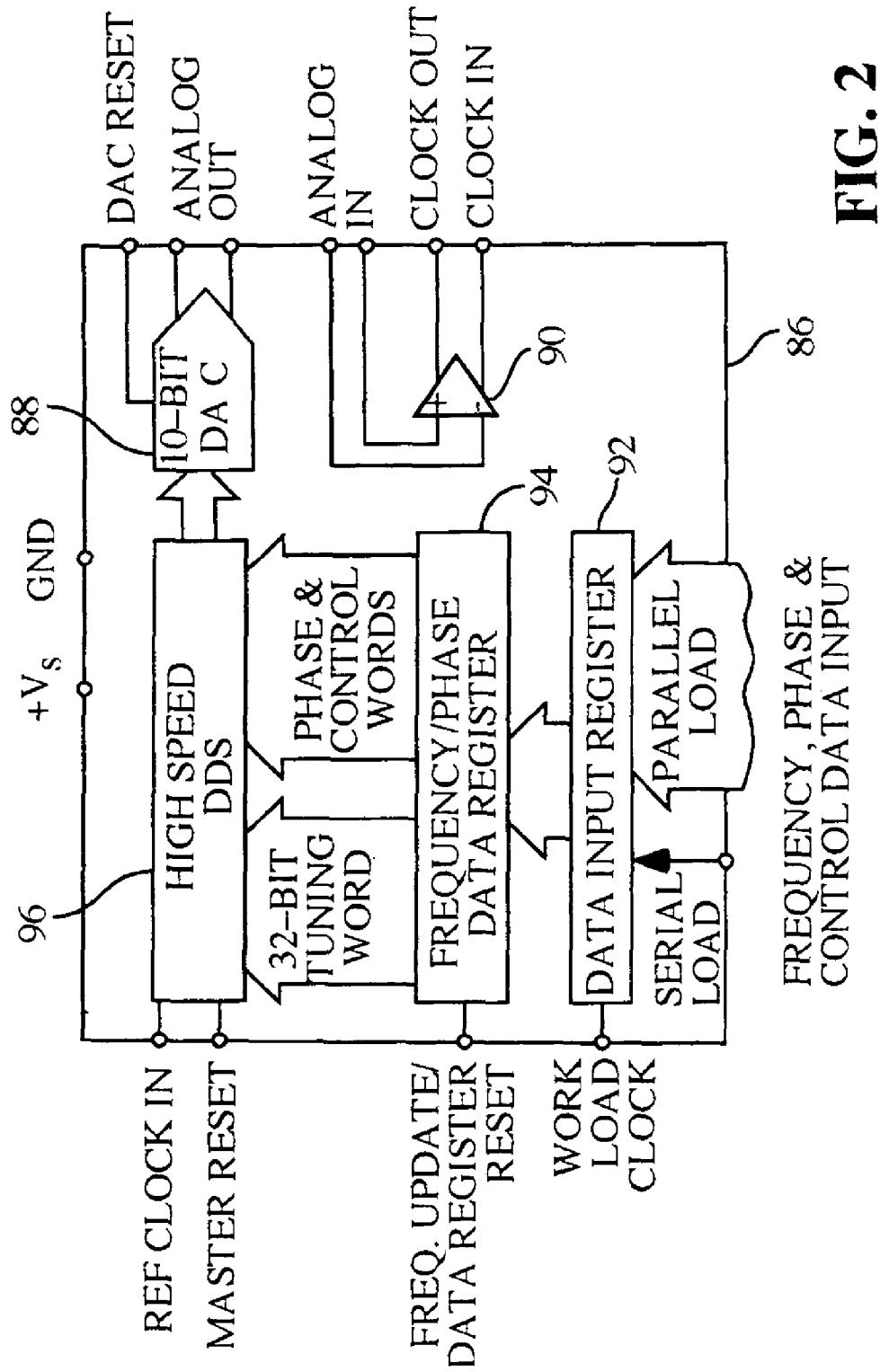
FIG. 2 is a block diagram of a direct digital synthesizer that may included in the fiber optic sensor system of FIG. 1A.

A direct digital synthesizer (DDS) array 84 provides oscillatory signal inputs having frequencies $f_1$–$f_6$ to the phase modulators 76–81, respectively. Analog Devices AD9850 CMOS 125 MHz DDS is suitable for use in the present invention. The basic structure of DDS circuitry 86 that may be included in the DDS array 84 is shown in FIG. 2. As shown in FIG. 2 a data input register 92 receives serial and parallel load inputs, which are input to a frequency/phase data register 94 under the control of a work load clock signal. The frequency/phase data register 94 produces a 32-bit tuning word and phase and control words that are input to a high speed DDS 96 under the control of a frequency update data register reset signal. The high speed DDS 96 receives reference clock in and master reset signals and provides an output to a digital to analog converter (DAC) 88 that is arranged to provide an analog signal output. The DDS array also includes a comparator 90 that receives analog inputs and provides clock out signal. The DDS 96 is a highly integrated device that uses advanced DDS technology coupled with the internal high speed, high performance, digital to analog (D/A) converter 88 and the comparator 90 to form a complete digitally programmable frequency synthesizer and clock generator. The DDS circuit 86 is used to generate a spectrally pure, frequency/phase programmable analog sine wave.

As shown in FIG. 1A, there are six phase modulators 76–81 connected to the DDS array 84. Accordingly, the array 84 includes the DDS circuit 86 and five additional DDS's (not shown) that are identical in structure to the DDS circuit 86. The DDS array 84 drives the phase modulators 76–81 to provide six phase generated carriers that are input to a sensor array 29.

Each of the polarization diversity detectors 50–65 may be formed to include three photodetector cells A, B and C as shown in FIG. 1B. The polarization diversity detectors 50–65 are fully disclosed in U.S. Pat. No. 5,852,507. The polarization diversity detector 50 is described briefly below. The polarization diversity detectors 51–65 should be regarded as being substantially identical to the polarization diversity detector 50. The polarization diversity detector 50 receives an optical signal from a single mode optical fiber 83 that transmits an optical signal from one of the lasers 12–17. The optical fiber 83 is rigidly supported within a structural support tube or ferrule 85, in a manner well-known in the art. The optical signal emerges as a beam from the proximal end of the optical fiber 83 and enters a focusing lens 87 after traversing an optical gap 89. The lens 87 is preferably a graded index lens, of the type that is commercially available from NSG America, Inc., Somerset, N.J., under the trademark "SELFOC", or the equivalent. The lens 87 focuses the optical beam in a manner to be described below. The gap 89 may be of any material, including air, which is transparent to the optical wavelength used. Preferably, the gap 89 is adjustable to assure that the optical beam enters the lens 87 with the proper amount of divergence to achieve the desired focal length for the lens.

The lens 87 is mechanically and optically coupled to a first polarizing beamsplitter 91. The first beamsplitter 91 comprises a first or input prism 93 (to which the lens 87 is coupled), and a second or output prism 95 that is coupled to the input prism 93 along a coated optical interface 97. The prisms 93 and 95 may be commercially available items of optical quality glass, preferably of the type marketed under the designation "BK7" by Schott Glasswerke, Mainz, Germany, or the equivalent.

The prisms 93 and 95 are preferably right-angled prisms. The optical interface between the prisms 93 and 95 forms an angle of 45° with respect to the incident optical beam I entering the first beamsplitter 91 from the lens 87. The interface 97 is optically coated to split the incident beam I into two beams, separated from each other by 90°, with different ratios of p-polarization and s-polarization of the optical signal. For this embodiment, the coating at the interface 97 is designed to achieve nearly an ideal 100% transmission of the p-polarized component of the signal, and thus nearly an ideal 0% reflection of the p-polarized component. For the s-polarized component, it is desired to achieve approximately an ideal transmission of 33%, and thus approximately an ideal reflection of 67%. Thus, the portion T of the optical signal transmitted through the interface 97 will include approximately 100% of its p-polarized component, and approximately 33% of its s-polarized component. The portion R of the optical signal reflected at the interface 97 will include almost none of its p-polarized component, and approximately 67% of its s-polarized component.

The specific coating needed to achieve the aforementioned polarization characteristics of the transmitted and reflected portions of the incident beam depends on the wavelength of the incident beam. If, for example, a nominal wavelength of 1320 nm is employed, the coating should be a quarter wave stack that comprises three layers of silicon nitride, each about 221 nm thick, alternated with two layers of silicon dioxide, each about 330 nm thick. These materials and dimensions will not achieve the ideal transmission and reflection ratios set forth above, but they will achieve sufficiently close approximations to yield useful results. It is considered to be well within the expertise of those of ordinary skill in the pertinent arts to provide specific coating compositions and thicknesses that are suitable for other wavelengths of potential interest.

The reflected portion R of the incident beam I is directed through the input prism 93, at a right angle to the transmitted portion, into the photodetector cell A. The transmitted portion T passes through the output prism 95 into a uniaxial calcite crystal plate 99 that is mechanically and optically coupled to the output prism 95 so as to receive the transmitted beam portion T therethrough. The calcite crystal plate 99 functions as a second polarizing beamsplitter and provides a 45° rotation of the polarization eigenstates of the transmitted beam portion T around its axis of propagation between the two beamsplitters 91 and 99.

The calcite crystal plate 99 propagates one linear polarization of the transmitted beam portion T as an ordinary ray, and the orthogonal polarization as an extraordinary ray at an angle of about 6° to the ordinary ray. The ordinary ray exits the calcite crystal plate 99 as a first transmitted beam portion $T_1$ which enters the photodetector cell B, while the extraordinary ray exits the calcite crystal plate 99 as a second transmitted beam portion $T_2$ which enters the photodetector cell C.

The photodetectors A, B and C produce analog electrical signals that indicate the intensity (i.e. AC amplitude) of the optical signals R, $T_1$, and $T_2$, respectively. The optical signals output from the sensor array are subject to signal fading caused by changes in polarization. The analog signals are digitized so that they can be input to the system processor 68. The system processor 68 selects which of the photodetector cells A, B or C produces the signal that will be processed to determine the sensor output. The system processor 68 selects the strongest signal that represents interference between optical signals for each channel in the sensor array 10.

Figure 3A:
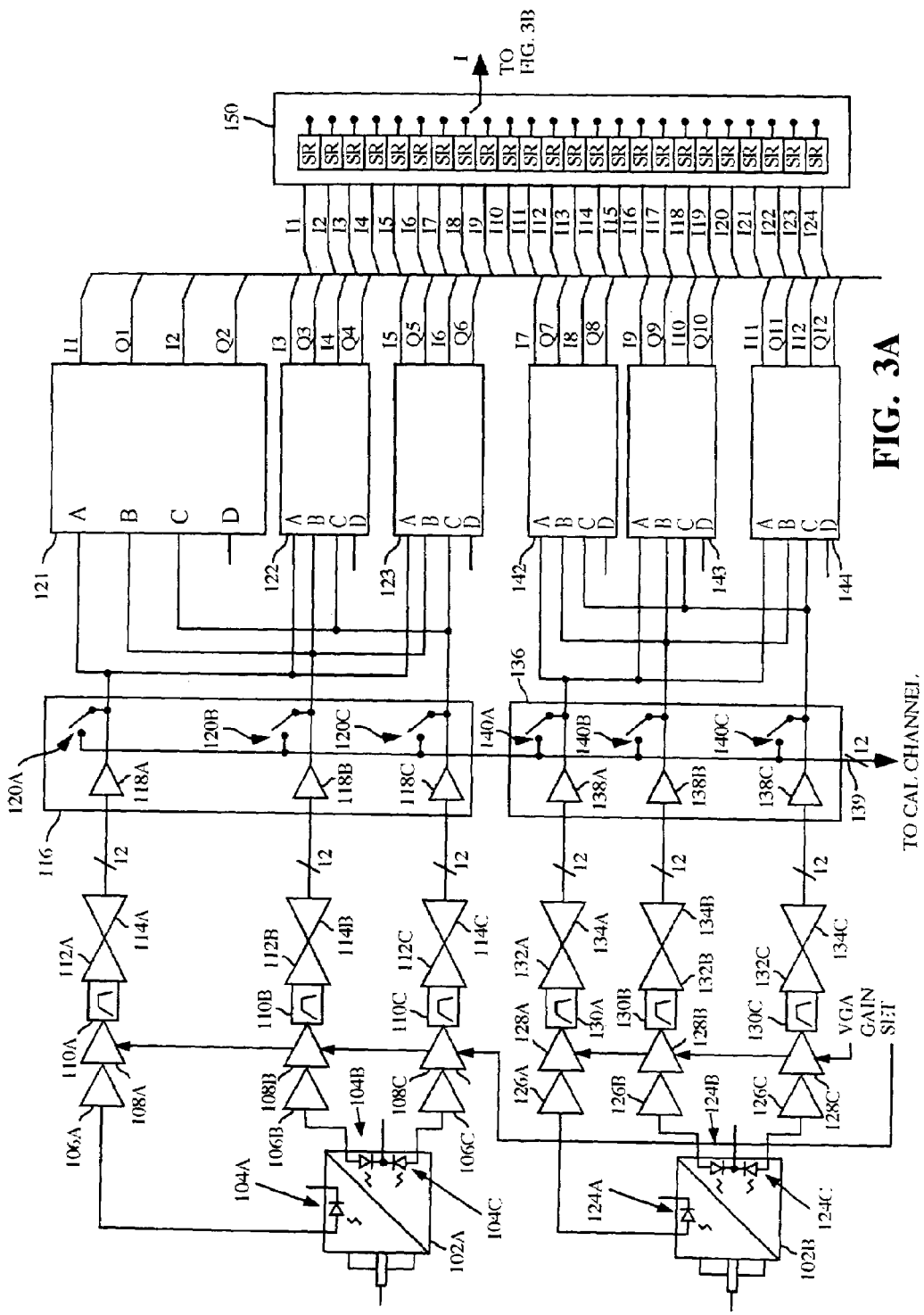
FIGS. 3A–3C illustrate an optical receiver system according to the present invention.
Figure 3B:
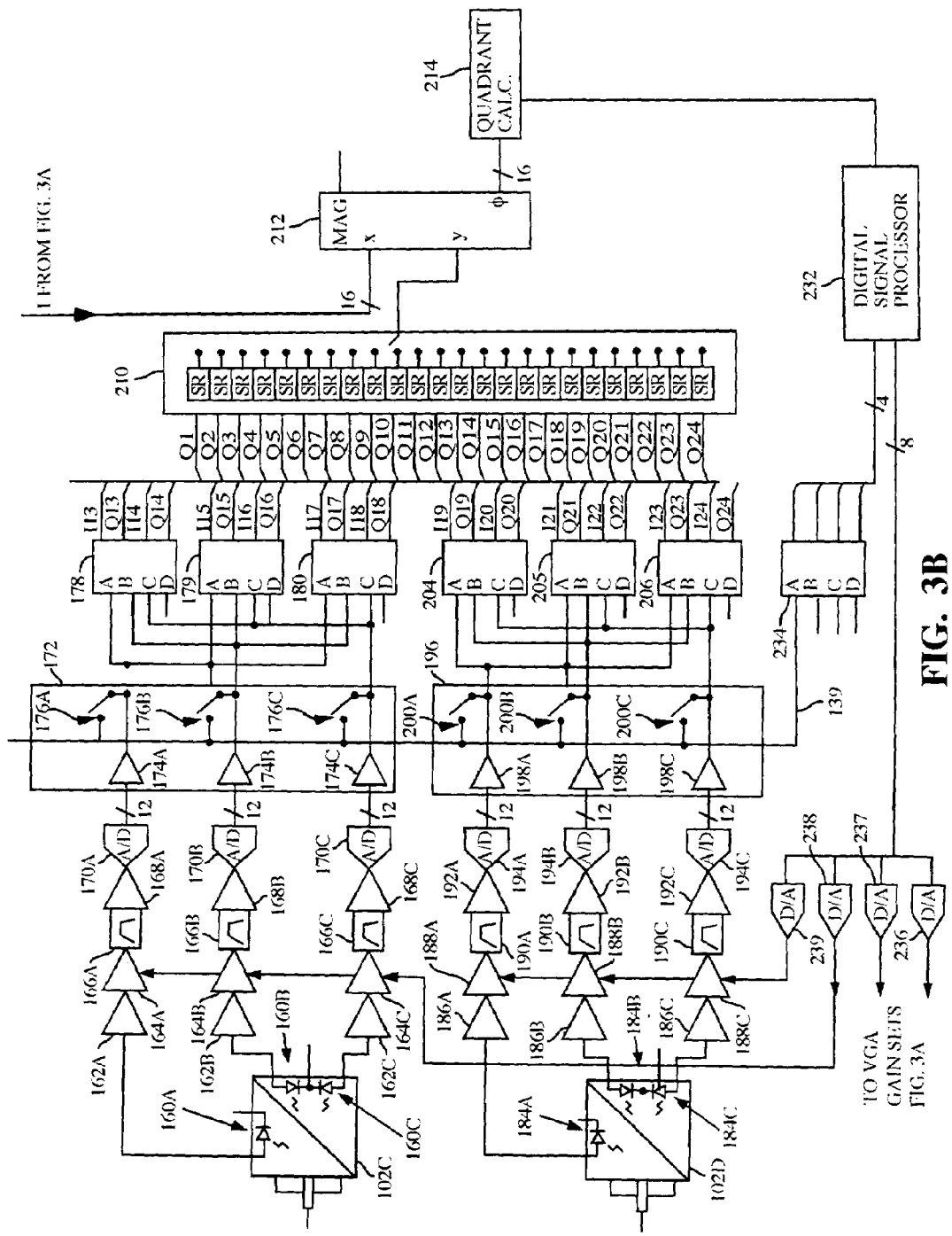

FIGS. 3A and 3B illustrate an optical receiver system 100 according to the present invention. The optical receiver 100 is used to determine the in-phase and quadrature components of each channel of the sensor output for two modulation frequencies $\omega_1$ and $\omega_2$, that are used in producing a phase generated carrier for the sensor system 10. The optical receiver system 100 shown has four polarization diversity detectors (PDDs) 102A–102D for each channel of the sensor array 10. The polarization diversity detectors 102A–102D may be formed in accordance with U.S. Pat. No. 5,852,507 (Hall), which was previously referenced in this disclosure.

Accordingly, the PDD 102A includes three photodetector cells 104A–104C that receive optical signals output from the fiber optic sensor system 10 and provide corresponding electrical signals to transimpedance amplifiers 106A–106C.

The outputs of the transimpedance amplifiers 106A–106C are input to corresponding variable gain amplifiers 108A–108C, respectively. The gains of the variable gain amplifiers 108A–108C are adjusted as explained subsequently to provide a wide sensitivity adjustment range. After being amplified by the variable gain amplifiers 108A–108C, the signals are input to corresponding passive antialias filters 110A–110C, respectively. After being filtered, the signals are input to corresponding unity gain buffer stages 112A–112C. The buffer outputs are coupled into analog to digital (A/D) converters 114A–114C.

The digital signals output from the A/D converters 114A–114C are input to a multiplexer 116 that includes amplifiers 118A–118C connected to switches 120A–120C, respectively. The multiplexer 116 is used in the receiver system 100 for controlling the gains of the variable gain amplifiers 108A–108C. Signals from each output channel of the PDD 100 pass through the multiplexer 116 to four channel demodulator circuits 121–123 that have input ports A–D. The outputs of the amplifiers 118A–118C are applied to the input terminals A–C, respectively, of each of the circuits 121–123. The circuits 121–123 are identical.

Figure 3C:
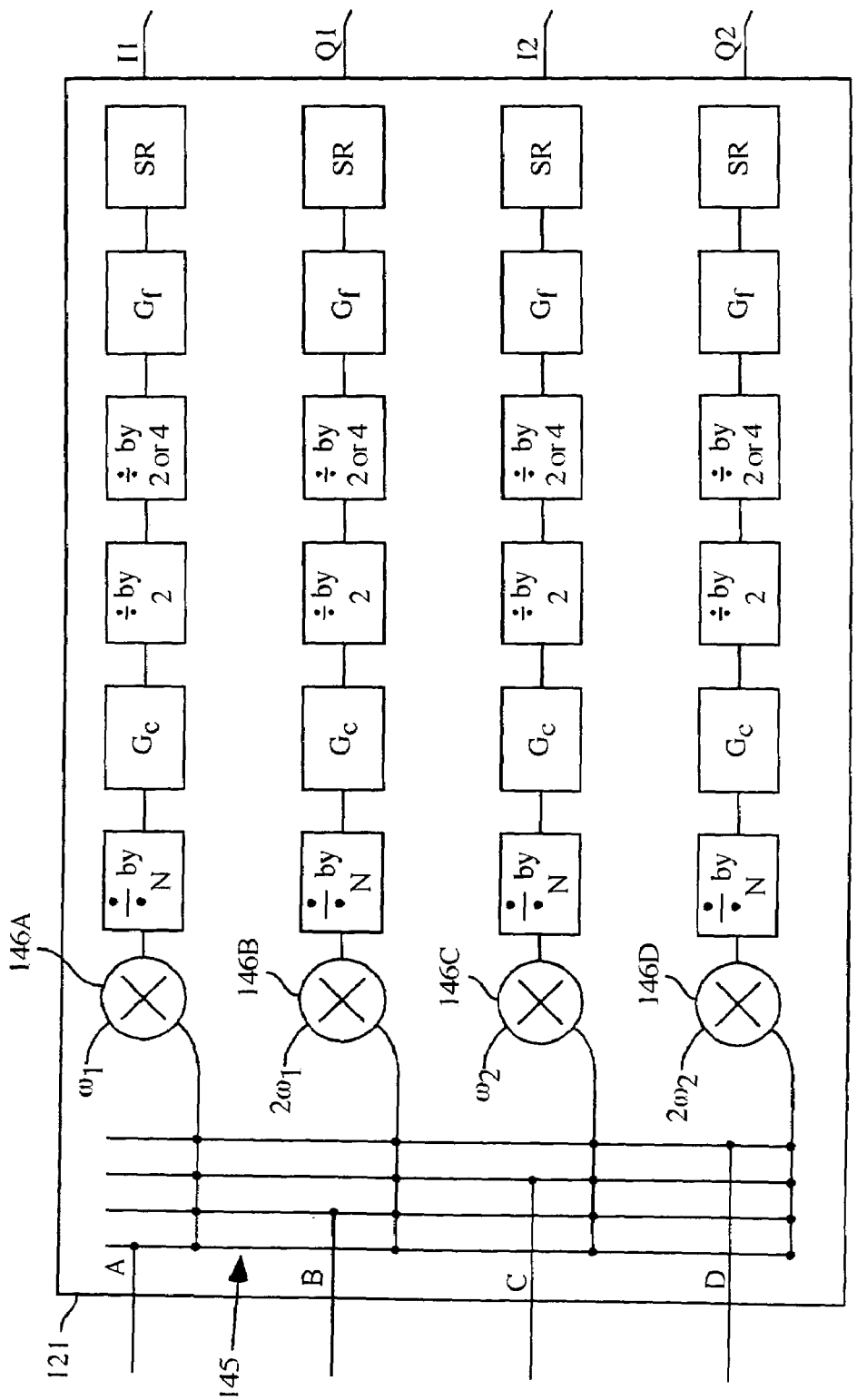

FIG. 3C shows components included in the demodulator circuit 121. A signal bus 145 inside the demodulator circuit 121 connects the signals output from all three channels of the multiplexer to each of four mixers 146A–146D. Recall that only optical signals of the same polarization will produce a useful signal output for the sensor system 10. Combining all of the outputs from the PDD 100 before applying them to the mixers provides the maximum possible signal resulting from aligned polarizations to the mixers 146A–146D.

The mixer 146A also receives a signal indicative of the first frequency $\omega_1$ used to create the phase generated carrier. The in-phase component $I_1$ is determined by channel A of the demodulator circuit 121. The mixer 146B receives a signal that indicates $2\omega_1$, which is related to the quadrature term $Q_1$. In like manner the mixers 146C and 146D receive signals that indicate the frequencies $\omega_1$ and $2\omega_1$, respectively, that are related to the in-phase term $I_2$ and the quadrature term $Q_2$, respectively.

The circuit 122 is arranged to process signals output from the PDD 100 to produce signal outputs $I_3$, $Q_3$, $I_4$ and $Q_4$, and the circuit 123 produces signal outputs $I_5$, $Q_5$, $I_6$ and $Q_6$.

The PDD 102B includes three photodetector cells 124A–124C that are connected to circuitry that is essentially identical to the circuitry described for the PDD 102A. This circuitry includes transimpedance amplifiers 126A–126C, variable gain amplifiers 128A–128C, anti-alias filters 130A–130C, unity gain buffer stages 132A–132C and analog to digital converters 134A–134C. Signals output from the analog to digital converters 134A–134C are input to a multiplexer 136, which is substantially identical to the multiplexer 116. Accordingly, the multiplexer 136 includes amplifiers 138A–138C connected to switches 140A–140C, respectively. Signals output from the amplifiers 138A–138C are applied to the input terminals A–C, respectively, of each of corresponding demodulator circuits 142–144, that are substantially identical to the demodulator circuits 121–123.

The polarization diversity detector 102C includes a plurality of photodetector cells 160A–160C that preferably are substantially identical to the photodetector cells 104A–104C. Likewise the polarization diversity detector 102D includes a plurality of photodetector cells 184A–184C that preferably are also substantially identical to the photodetector cells 104A–104C.

The same applies to the PDD's 102C and 102D. Accordingly the PDD 102C includes transimpedance amplifiers 162A–162C, variable gain amplifiers 164A–164C, anti-alias filters 166A–166C, unity gain buffer stages 168A–168C and analog to digital converters 170A–170C. Signals output from the analog to digital converters 170A–170C are input to a multiplexer 172, which is substantially identical to the multiplexer 116. Accordingly, the multiplexer 172 includes amplifiers 174A–174C connected to switches 176A–176C, respectively. Signals output from the amplifiers 174A–174C are applied to the input terminals A–C, respectively, of each of corresponding demodulator circuits 178–180, that are substantially identical to the demodulator circuits 121–123.

The PDD 102D includes transimpedance amplifiers 186A–186C, variable gain amplifiers 188A–188C, anti-alias filters 190A–190C, unity gain buffer stages 192A–192C and analog to digital converters 194A–194C. Signals output from the analog to digital converters 194A–194C are input to a multiplexer 196, which is substantially identical to the multiplexer 116. Accordingly, the multiplexer 196 includes amplifiers 198A–198C connected to switches 200A–200C, respectively. Signals output from the amplifiers 198A–198C are applied to the input terminals A–C, respectively, of each of corresponding demodulator circuits 204–206, that are substantially identical to the demodulator circuits 121–123.

Demodulator circuits 142–144, similar to the demodulator circuits 121–123, respectively, are arranged to produce signal outputs $I_7$–$I_{12}$ and $Q_7$–$Q_{12}$. The signals $I_1$–$I_{12}$ are input to a shift register 150. The signals $Q_1$–$Q_{12}$ are input to a shift register 210.

In a similar manner, the signals output from the PDD 102C and the PDD 102D are demodulated by demodulator circuits 178–180 and 204–206, respectively, to produce signals $I_{13}$–$I_{24}$ that are input to the shift register 150 and signals $Q_{13}$–$Q_{24}$ that are input to the shift register 210. The I signals from the shift register 150 and the Q signals from the shift register 210 are the rectangular coordinates of the signals output from the sensor array 10. The I and Q signals are input to a rectangular to polar converter 212 that produces a first signal that indicates the magnitude of the output signal and a second signal that indicates the phase difference $\phi$ determined using the arctangent function. The phase difference signal is input to a circuit 214 that determines the quadrant of the angle $\phi$.

A bus 139 connects each of the multiplexers 116, 136, 172 and 196 to a saturation detection logic circuit 234. The saturation detection logic circuit 234 is also connected to a digital signal processor (DSP) 232. The switches 120A–120C, 140A–140C, 176A–176C and 200A–200C are selectively actuated so that the outputs of the A/D converters 114A–114C, 134A–134C, 170A–170C and 194A–194C are individually monitored by the saturation detection circuit 234.

The saturation detection circuit 234 sends a signal to the DSP 232 if a saturation condition exists. The DSP 232 responds to a saturation signal by adjusting the gains of the variable gain amplifiers. Digital to analog (D/A) converters 236–239 are connected between the DSP 232 and the gain adjust terminals of the variable gain amplifiers 110A–110C, 128A–128C, 164A–164C and 188A–188C, respectively. The present invention provides gain adjustment via the D/A converters 236–239 sufficient to provide at least 40 dB adjustment in the sensitivity.

The saturation logic circuit 234 preferably compares each signal input from the multiplexers 116, 136, 172 and 196 to a reference signal that preferably represents 90% of a predetermined full scale output from the ADC's 112A–112C, 134A–134C, 170A–170C and 194A–194C. If the signal input to the saturation logic circuit 234 exceeds the reference signal for a predetermined number of consecutive clock cycles (e.g., five), the saturation logic circuit 234 interrupts the DSO 232. The DSP subsequently reads a saturation status register (not shown) in the saturation logic circuit 234, which contains information about saturated ADC's. The DSP 232 uses the saturation status information to reduce the current gain setting in the corresponding variable gain amplifiers 108A–108C, 128A–128C, 164A–164C and 186A–186C by about 3 dB. This sequence of steps is repeated until the saturation logic circuit 234 fails to detect a saturation condition for a selected number of consecutive clock cycles (e.g., five).

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An optical receiver system for processing signals output from a polarization diversity detector that includes a plurality of photodetector cells, the polarization diversity detector output signals including for each photodetector cell a phase generated carrier signal having a modulation frequency $\omega$ and a sensor signal having an in-phase component I and a quadrature phase component Q superimposed on the phase generated carrier signal, comprising:
    a plurality of variable gain amplifiers arranged in corresponding relationship to the photodetector cells and arranged to produce a plurality of amplified signals;
    a feedback circuit connected to the plurality of variable gain amplifiers for controlling the gains thereof; and
    a plurality of demodulator circuits arranged to receive the amplified signals, the demodulator circuits being arranged to provide for each photodetector cell an I signal output that indicates an amplitude of the in-phase component I and a Q signal output that indicates an amplitude of the quadrature phase component Q.

2. The optical receiver system of claim 1 wherein the feedback circuit comprises:
    a saturation detection circuit that provides a saturation signal if the amplified signal output from any of the variable gain amplifiers exceeds a predetermined value; and
    a signal processor connected to the saturation circuit, the signal processor being arranged to produce a gain control signal for reducing the gain of the variable gain amplifier if a saturation condition exists.

3. The optical receiver of claim 2 wherein the feedback circuit comprises a multiplexer arranged to receive the amplified signals and selectively provide the amplified signals to the signal processor.

4. The optical receiver system of claim 2, further comprising a plurality of digital to analog converters connected between the signal processor and the variable gain amplifiers to provide the gain control signal to the variable gain amplifiers.

5. The optical receiver system of claim 1 wherein each of the plurality of demodulator circuits comprises:
    a first mixer that combines the polarization diversity detector output signal with a first demodulation signal of frequency $\omega$ to separate the in-phase output signal I from the phase generator carrier signal; and
    a second mixer that combines the polarization diversity detector output signal with a second demodulation signal of frequency $2\omega$ to separate the in-phase output signal Q from the phase generator carrier signal.

6. The optical receiver of claim 1, further comprising a plurality of analog to digital converters connected between the variable gain amplifiers and the feedback circuit.

7. The optical receiver system of claim 6, further comprising a plurality of anti-alias filter connected between the variable gain amplifiers and the analog to digital converters.

8. The optical receiver circuit of claim 7, further comprising a plurality of unity gain buffer stages connected between the anti-alias filters and the analog to digital converters.

9. An optical receiver system for processing signals output from a polarization diversity detector array that includes a plurality of polarization diversity detectors, each of the plurality of polarization diversity detectors including a plurality of photodetector cells that each provide a detector signal that includes a phase generated carrier signal having a modulation frequency and a corresponding sensor signal that has an in-phase component I and a quadrature phase component Q superimposed on the phase generated carrier signal, comprising:

a plurality of channels arranged in corresponding relationship with polarization diversity detector, each channel comprising:

a plurality of variable gain amplifiers arranged in corresponding relationship to the photodetector cells in each polarization diversity detector and arranged to produce a plurality of amplified signals;

a feedback circuit arranged in corresponding relationship to the plurality of variable gain amplifiers for controlling the gains thereof; and a plurality of demodulator circuits connected arranged to receive corresponding amplified signals, each of the demodulators circuit being formed to provide and I signal output that indicates an amplitude of the in-phase component I and a Q signal output that indicates an amplitude of the quadrature phase component Q;

a first shift register arranged to receive the I signal output from each of the demodulator circuits;

a second shift register arranged to receive the Q signal output from each of the demodulator circuits; and a rectangular to polar converter connected to the first and second shift registers for calculating a phase angle for each corresponding I signal and Q signal.

10. The optical receiver system of claim 9 wherein the feedback circuit comprises:

a multiplexer arranged to receive the amplified signals from the variable gain amplifiers for each polarization diversity detector;

a saturation detection logic circuit connected to the multiplexer to receive the amplified signals, the saturation logic circuit being arranged to provide a saturation signal for each amplified signal that exceeds a predetermined threshold; and a signal processor connected to the saturation detection logic circuit, the signal processor being arranged to produce a gain control signal for reducing the gain of each variable gain amplifier whose output exceeds the threshold.

11. The optical receiver system of claim 10, further comprising a plurality of digital to analog converters connected between the signal processor and the polarization diversity detectors in corresponding relationship to provide the gain control signals to the variable gain amplifiers in each of the polarization diversity detectors.

12. The optical receiver system of claim 9 wherein each of the plurality of demodulator circuits comprises:

a first mixer that combines the polarization diversity detector output signal with a first demodulation signal of frequency $\omega$ to separate the in-phase output signal I from the phase generator carrier signal; and a second mixer that combines the polarization diversity detector output signal with a second demodulation signal of frequency $2\omega$ to separate the in-phase output signal Q from the phase generator carrier signal.

13. The optical receiver of claim 9 further comprising a plurality of analog to digital converters connected between the variable gain amplifiers and the feedback circuit for each of the polarization diversity detectors.

14. The optical receiver system of claim 13, further comprising a plurality of anti-alias filter connected in corresponding relationship between the variable gain amplifiers and the analog to digital converters in each of the polarization diversity detectors.

* * * * *